April 30, 1968    N. C. FOLDEN    3,380,468
FLUID INFUSION APPARATUS
Filed June 18, 1964    3 Sheets-Sheet 2
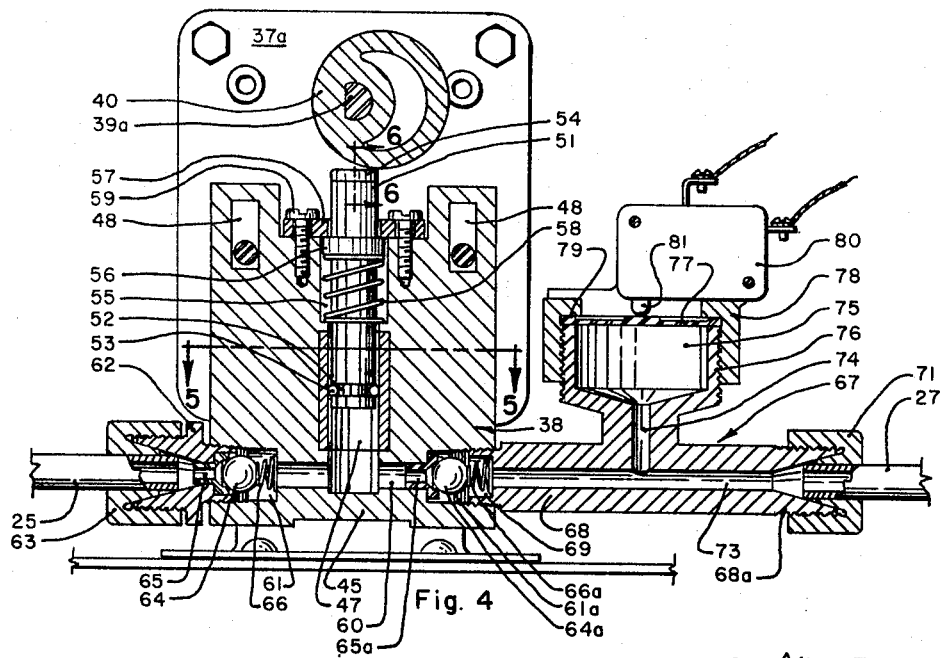
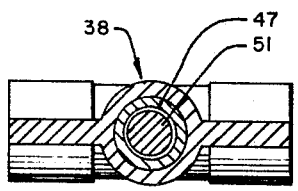
Fig. 5
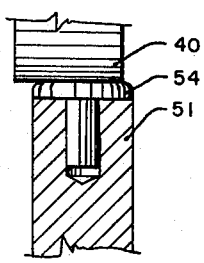
Fig. 6
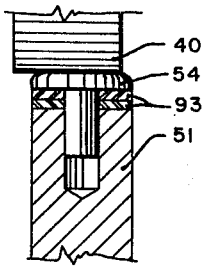
Fig. 7
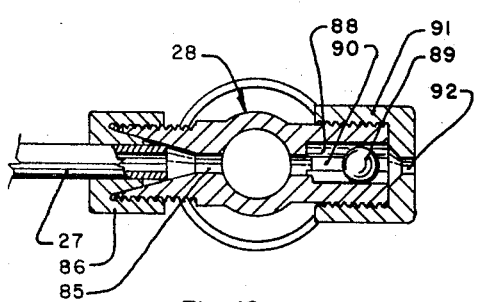
Fig. 10
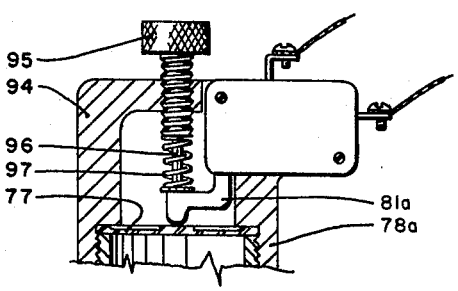
Fig. 8
INVENTOR.
Norman Chip Folden
BY Frank C. Lowe
Attorney April 30, 1968   N. C. FOLDEN   3,380,468
FLUID INFUSION APPARATUS
Filed June 18, 1964   3 Sheets-Sheet 3

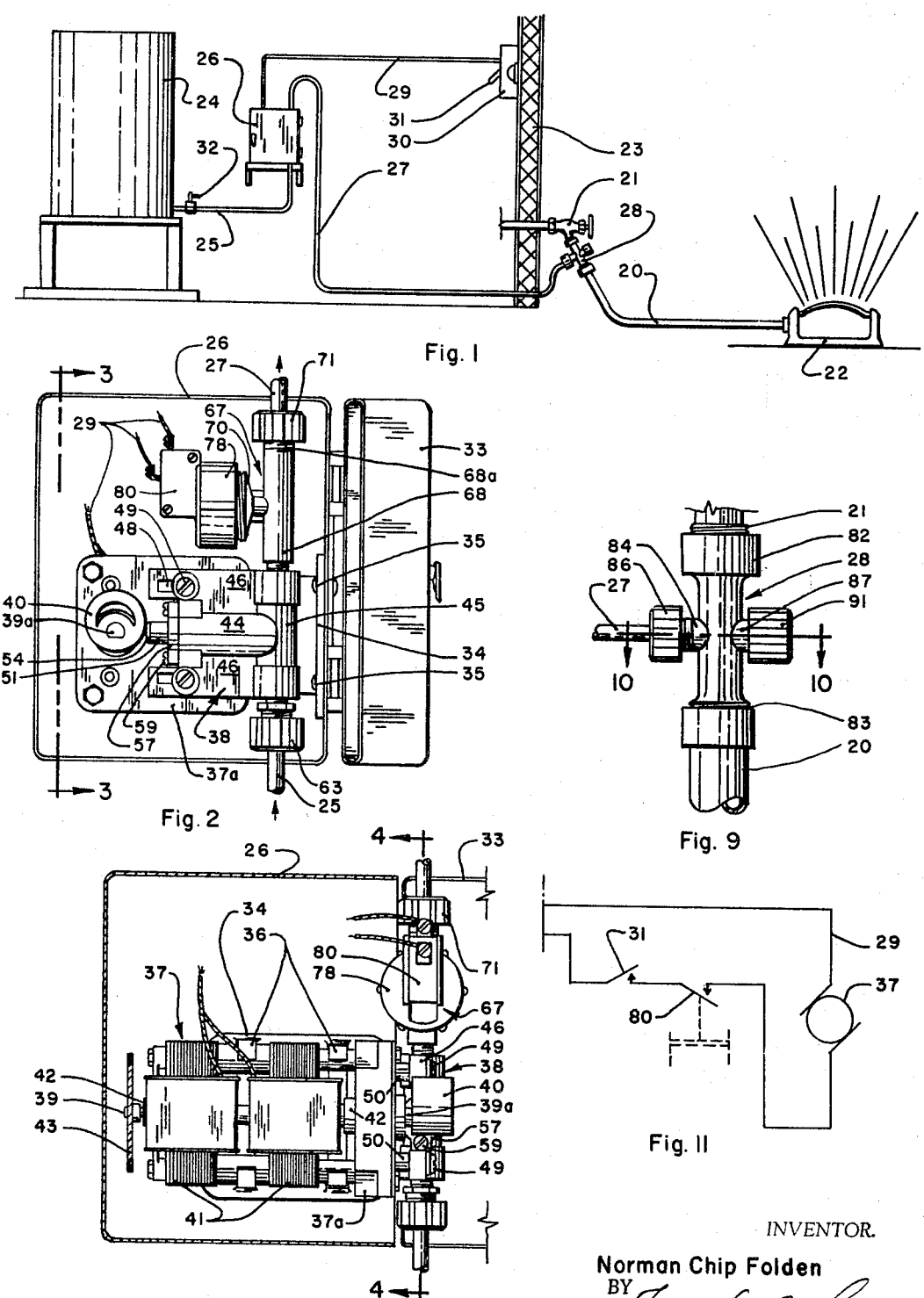

INVENTOR.
Norman Chip Folden
BY
Frank C. Lowe
Attorney

United States Patent Office 3,380,468
Patented Apr. 30, 1968

3,380,468
FLUID INFUSION APPARATUS
Norman Chip Folden, Hacienda Heights, Calif., assignor to Ke Marc Research Div. The Vigilantes, a nonprofit corporation of California
Filed June 18, 1964, Ser. No. 376,126
3 Claims. (Cl. 137—101.19)

This invention relates to means and apparatus for infusing and intermixing fluids, and more particularly for infusing a fluid concentrate into a line flow. The invention is especially adapted to infuse a liquid fertilizer concentrate into the water line of an irrigation system and will be hereinafter described with reference to such use, although it is to be understood that the apparatus constituting the invention need not be restricted to such use.

An object of the present invention is to provide a novel and improved apparatus adapted to infuse a small flow of liquid fertilizer concentrate into an irrigation water supply line wherenever water flows through the line.

Another object of the invention is to provide a novel and improved infusion apparatus adapted to pump and infuse a small measured flow of liquid concentrate into an irrigation water supply line which starts operation responsive to a back pressure in the line, but which is positive in its action and will not vary in amount with variations of back pressure.

Another object of the invention is to provide a novel and improved pumping apparatus for infusing a liquid fertilizer concentrate into an irrigation water supply line which is adapted to automatically commence operation whenever the line is opened for water flow therethrough and to automatically cease operation whenever the line is closed and the water flow ceases.

Another object of the invention is to provide a novel and improved apparatus for infusing a liquid fertilizer concentrate into an irrigation water supply line which is especially adapted for home and garden use and provides an effective unit which may be simply connected to an ordinary garden faucet to which a sprinkler hose is attached and will automatically pump concentrate into the garden hose whenever the hose is being used for irrigation, but will not function whenever the hose is disconnected from the faucet.

Another object of the invention is to provide a novel and improved pumping apparatus for infusing liquid fertilizer concentrate into an irrigation water supply line, which is further adapted to be installed in permanent irrigation systems to operate whenever irrigation operations by sprinkling or otherwise are underway.

A further object of the invention is to provide in combination with an apparatus for infusing a liquid concentrate into a water line, a supplementary apparatus for adding compressed gases such as carbon dioxide and ammonia into the line which is adapted to automatically operate with the infusion apparatus.

A further object of the invention is to provide a novel and improved apparatus for infusing a liquid fertilizer concentrate into a water line, which is uniquely formed to provide a very compact, low-cost, economical, rugged and durable unit.

With the foregoing and other objects in view, all of which more fully hereinafter appear, my invention comprises certain constructions, combinations and arrangements of parts and elements as hereinafter described, defined in the appended claims and illustrated in preferred embodiment in the accompanying drawing in which:

FIGURE 1 is a diagrammatic elevational view of a liquid fertilizer concentrate infusion system for a water hose sprinkling arrangement, including a supply tank, a closed box containing the improved infusion apparatus, and a line to the faucet of a conventional hydrant, to which the hose is connected.

FIGURE 2 is a front elevational view of the box containing the infusion pump and control apparatus, shown at FIG. 1, but on an enlarged scale and being open to illustrate the components therewithin.

FIGURE 3 is a side elevational view of the components within the box, as taken from the indicated line 3—3 at FIG. 2.

FIGURE 4 is a sectional elevational view of the pumping and control mechanisms, as taken from the indicated line 4—4 at FIG. 3, but on an enlarged scale.

FIGURE 5 is a fragmentary sectional detail as taken from the indicated line 5—5 at FIG. 4.

FIGURE 6 is a fragmentary portion of pumping components in the apparatus, as taken from the indicated line 6—6 at FIG. 4, but on a further enlarged scale.

FIGURE 7 is a fragmentary view, similar to FIG. 6, but illustrating certain modifications thereto.

FIGURE 8 is a fragmentary portion similar to the showing at FIG. 4, but illustrating a modified construction of the control component of the apparatus.

FIGURE 9 is an elevational view of the member which connects the line of the apparatus to a faucet, which functions to relieve and prevent a siphon action in the apparatus when the system is not in use.

FIGURE 10 is a sectional view, as taken from the indicated line 10—10 at FIG. 9, but on an enlarged scale.

FIGURE 11 is a circuit diagram which may be used in the apparatus.

Figure 12:
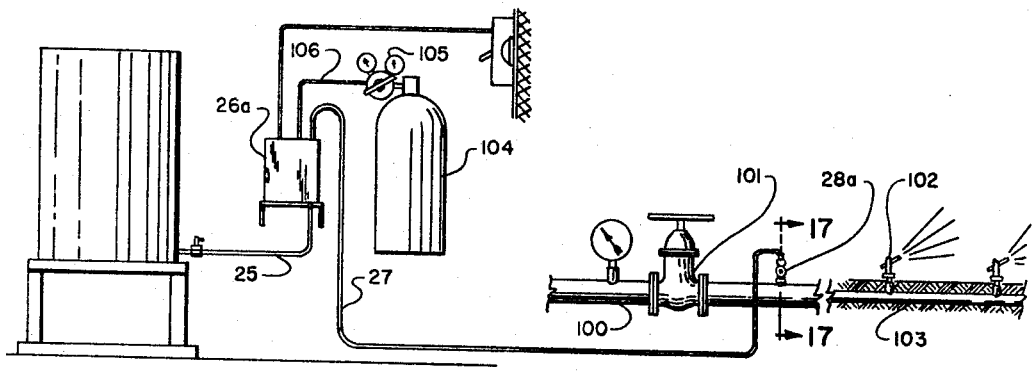
FIGURE 12 is a diagrammatic elevational view of another liquid fertilizer concentrate infusion system similar to FIG. 1, but illustrating the same as being associated with the supply line of a permanent irrigation system and illustrating further, the inclusion of a gas tank to infuse gas into the irrigation system in addition to the infusion of liquid concentrate.

Referring more particularly to the drawing, the arrangement illustrated at FIG. 1 provides a simple apparatus for infusing liquid fertilizer concentrate into a water hose of the type commonly used for sprinkling a lawn. The garden hose 20 is ordinarily attached to a water supply faucet 21, and a sprinkler head 22 is connected to the end of the hose. The faucet is usually located at the wall 23 of a building, and it is usually possible to house the liquid fertilizer concentrate apparatus at a convenient location within the building and near the faucet.

The liquid fertilizer concentrate is contained in any suitable tank 24. A supply tube 25 extends from the tank to a container box 26 to connect with the infusing and control mechanism therein, as will be hereinafter described. A delivery tube 27 extends from this box and connects into the side of a cross 28, which is connected to the faucet 21 between the faucet and the hose 20. This cross 28 is adapted to not only permit concentrate to flow into the hose, but also to relieve the line from sub-atmospheric pressure which could cause an undesirable siphon action whenever the faucet is shut off, as will be hereinafter described.

To complete the arrangement, an electric power supply line 29 extends from the box 26 to a control box 30 which contains a shut-down switch 31 which is opened to turn off the apparatus when it is not to be used. Other controls in the system may include a line valve 32 at the base of the tank which may be closed when the system is not in use.

The pump and control mechanisms are conveniently housed in the box 26 which is normally closed as by a door 33 to provide a neat-appearing, compact unit. Suitable openings and notches are formed in the box or the lid so that the fluid lines 25 and 27 and the electric line 29 may pass into and out of the box when it is closed.

The pump and control mechanisms are supported by a base 34 affixed to one side of the box as by rivets 35, and spring clips 36 upstand from this base to grasp the motor body 37. The motor includes a gear reduction box 37a at one side thereof, and the infusion pump 38 is carried on the outer face of this gear reduction box.

The motor 37 outstands from a face of the gear box 37a to permit the shaft 39 to extend perpendicularly into the box. The output shaft 39a of the gear box, at the other side, carries a cam 40 which actuates the pump piston as hereinafter described. The motor itself is preferable a double unit with two armature-field components 41 mounted in tandem on the common shaft 39 to provide for greater and better balanced torque on the drive shaft 39. The body of this double motor is otherwise conventional, including conventionally arranged bearings 42 in the gear box 37a and elsewhere in the frame. A suitable cooling fan 43 is mounted on the shaft, as illustrated.

The pump 38 is a reciprocating type and is formed as a cylinder 44 which stands from the center of a tubular base leg 45, in the general form of a T. A pair of flat, diametrically-opposing mounting flanges 46 outstand from the sides of this pump cylinder and from a side of the leg 45, in the plane of the T. This pump unit is preferably formed as a unitary member molded of a suitable synthetic resin to provide for a simply-constructed, low-cost unit. Such resin may be one of several conventional types such as polypropylene, or any similar type characterized by strength, toughness, dimensional stability and resistance to the chemical action of concentrates which will be pumped through it. The material should also possess wear-resistant qualities under repeated reciprocation of a piston, to remain leakproof after continuous use. Although some resins possess such properties, it is desirable to provide an inner sleeve 47 of a smooth-surface, wear-resistant material such as polished glass which is effectively immune to the action of chemicals when the pump is operating.

This pump is mounted upon the face of the gear box 37a opposite to the face whereon the motor is mounted, and is positioned thereon so that the axis of the cylinder intersects the axis of the motor shaft 39 and preferably in a position normal to the base 34 so that the axis of the base leg 45 is parallel to the surface of this base 34. To render the pump shiftable with respect to the position of the cam 40 on shaft 39a for purposes of adjustment, as will be explained, a slot 48 is formed in each mounting flange 46 which parallels the axis of the cylinder. Lock screws 49 extend through these slots and into suitable tapped holes in the box 36, with spacers 50 outstanding from the gear being used between the flanges and the box, to hold the pump a short distance away from the surface of the gear box and provide fitting clearances.

The piston 51 is formed as a simple cylindrical, metallic or plastic member slidably fitting in the sleeve 47. It includes a groove 52 adjacent to its base to carry an O-ring seal 53. This base portion of the piston is adapted to reciprocate within the sleeve 47 and the upper portion of the piston 51 extends through and above the cylinder with its top end, preferably capped by a wear-proof button 54, being adapted to contact the cam 40.

The upper portion of the cylinder is formed as an enlarged passageway 55, and the piston 51 is formed with a collar 56 which is adapted to slidably fit within this passageway to move from a top position, as at the top of the passageway 55, where further movement is prevented by a retainer 57, to a selected distance therebelow depending upon the positioning with respect to the cam 40. A spring 58 is positioned within the passageway 55 with its lower end resting upon the bottom of the passageway and the upper end abutting against the collar 56, as in the manner clearly illustrated at FIG. 4. This assembly is held in position by the retainer 57 which includes a central passageway through which the piston portion above the collar 56 extends. Side holes are located in the retainer to accommodate mounting screws 59. These screws are turned into suitable threaded taps in the cylinder body as illustrated at FIG. 4.

The tubular base leg 45 of this pump includes a passageway 60 through it, connecting with the cylinder. The passageway is formed with enlargements 61 and 61a at its ends for retaining directional check valves. Also, each enlargement is tapped with conventional thread for connective purposes. A tubing connector adaptor 62 is turned into the enlargement at the intake side of the unit and a tubing connector 63, holding the end of the supply tube 25, is fastened to the adaptor 62. A check valve is formed in this intake enlargement 61 which permits liquid to flow from the tube 25 and into the pump, but not otherwise. A ball 64 is adapted to normally rest upon a seat insert 65 which is carried in the passageway of the adaptor 62. A spring 66 between the ball and the bottom of the enlargement resiliently urges the ball against the seat insert 65.

A second check valve is formed in the discharge enlargement 61a which permits liquid to flow from the pump and into a cut-out control 67 connected thereto, but not otherwise. The cut-out control 67 is formed as a T-shaped member, and an arm 68 is threaded and connected directly into the discharge enlargement 61a to form a rigid assembly. A ball 64a within the enlargement is adapted to normally rest upon a seat insert 65a which is carried in the passageway 60 at the base of the enlargement 61a. A spring 66a is fitted into a socket 69 at the end of the arm 68 to bear against the ball 64a and resiliently urge it against the seat 65a.

The T-shaped cut-out control 67 includes aligned arms 68 and 68a and a reservoir leg 70. The intake arm 68 is threaded for connection into the pump discharge enlargement 61a, as described, while the end of the discharge arm 68a is suitably threaded and formed to constitute a tubing connector 71. A tubing connector nut 72, holding the intake end of the delivery tube 27, is fastened to this connector end 71, the tube 27 extending from such connection to the hose as hereinbefore described.

A passageway 73, extending through the arms 68 and 68a, connects with a passageway 74 extending through the leg 70 and this passageway 74 enlarges into a reservoir 75 at the end of the leg. This reservoir is formed within an enlarged, threaded head 76 at the end of the leg, and a diaphragm 77 lies across the end of the head to close the passageway. It is held in position by a sleeve nut 78 which is internally threaded to be turned upon the head, and having an internal shoulder 79 to grip and hold the peripheral edge of the diaphragm to permit the diaphragm to flex responsive to variations in water pressure. A normally open microswitch 80 is mounted upon this sleeve nut 78 in a position so that its actuating leg 81 is pressed against the exposed surface of the diaphragm to operate to close responsive to outward movement of the diaphragm, as by an increase in water pressure within the reservoir. The microswitch is connected in one leg of the power supply line 29, and closes to start the motor 37 and initiate pumping of the fertilizer concentrate, as will be further described.

The discharge line 27 of the infusion apparatus terminates at the cross 28. This cross is formed as a short adaptor having an internally threaded female end 82 at one end of its body, which is adapted to be turned onto the threads of a common garden faucet 21, as illustrated. The other end of its body is formed with a male faucet thread 83 to receive the end of a conventional garden hose 20. One arm 84 of the cross outstands from the body and is threaded and formed to constitute a tubing connector with a passageway 85 into the cross. A tubing connector 86, holding the discharge end of the delivery tube 27 is fastened to this connector end 84, as illustrated at FIG. 10.

The other arm 87 of the cross outstands from the body and is formed as a short threaded tubular stub having a sized passageway 88 which loosely holds a check ball 89. This passageway is fluted as at 90 to form bypasses about the ball 89 regardless of its position in the passageway 88. A closure nut 91, having a central seat-forming orifice 92, is tightly fitted upon this arm 87. Whenever positive pressure exists in the water line and in the cross, the ball 89 is pressed against this orifice 92 to close the passageway through that leg, but whenever the line pressure drops to a subatmospheric pressure, the ball moves away from the orifice to permit air to flow therein through the flutes 90 to break any vacuum which might otherwise form in the line.

From the above description of the components, operation of this arrangement is manifest. To place the system in readiness for operation, the main switch 31 is closed. However, the microswitch 80 will remain open to prevent the motor 37 from running. It will close whenever water is turned on at the faucet 21 to sprinkle a lawn or garden, the closing being effected by back pressure in the hose 20. This back pressure commences as soon as water flows through the hose, and acts to close the relief orifice 92 by the ball 89 and to distend the diaphragm 77 and close the microswitch 80. The resulting closing of the microswitch initiates operation of the motor 37 and infusion pump 38 as the cam rotates to reciprocate the piston 51. Reciprocation of the piston and the action of the two check balls 64 and 64a forces fluid through the pump, each upward stroke of the piston bringing fluid into the pump cylinder from the supply line 25 and each downward stroke of the piston forcing fluid from the cylinder and into the discharge line 27.

When the watering operation is stopped and the hose is shut off at the faucet 21, the pressure drops to retract the diaphragm 76 and open switch 80. This shuts off the motor 37 to stop all infusion action. If the elevation of the sprinkler 22 is below the faucet, a siphon action could be set up which might conceivably drain the fertilizer tank 24, except for the vacuum relief action of the ball 89 moving away from orifice 92, in the cross 28, and relieving any subatmosperic pressure.

This apparatus permits the gardener to apply a small amount of fertilizer to a lawn or garden every time he waters the lawn without any special attention to the system. However, if he wants to draw water from the faucet for other purposes, as to fill a pail, he disconnects the hose, and the faucet may then be used without paying any attention to the system, for without the hose there is not sufficient back pressure in the cross 28 to initiate operation of the infusion apparatus. However, if necessary, the system may easily be shut off by opening the control switch 31.

The amount of fluid concentrate delivered to the system by the pump 38 is easily regulated by simple adjustments. The cam 40 is preferably formed as a circular member eccentrically mounted upon the shaft 39a, and the pump 38 may be positioned upon the mounting box 37a at any suitable distance from the cam so that the top 54 of the piston strikes only a selected portion of the cam 40 as it rotates upon its shaft. This type of adjustment may be easily made by loosening the lock screws 49, shifting the pump so the screws 49 assume a selected position in slots 48, and then retightening them. Another mode for such adjustment may be by the use of spacer washers 93 under the end button 54 of the piston 51 as in the manner illustrated at FIG. 7.

In certain irrigation systems, the elevation of the areas to be watered will be above the elevation of the faucet 21 or above the elevation of a main water supply line such as in a permanent system as illustrated digrammatically at FIG. 12. In such cases there is apt to be a back pressure at the faucet and in the system at all times. Under such circumstances, the diaphragm 77 must be stiffened or otherwise adjusted to be inoperative under pressures which are created by the elevational differences of the watered areas and the faucet or line location, and be operative only when flow through the hose or line creates additional back pressure. One modification of the cut-out control 67 to provide for such adjustment is illustrated at FIG. 8. In the arrangement a modified sleeve nut 78a includes an arm 94 which extends over the diaphragm 77 and holds an adjusting nut 95 in axial alignment with the axis of the diaphragm. This adjusting nut is tubular, and a pin 96 extends from an offset switch leg 81a with a spring 97 positioned between the base of the adjusting unt 95 and the switch leg 81a to bear against the diaphragm with sufficient pressure to offset the elevational back pressure in the system.

A modified infusion system is illustrated at FIG. 12, where the apparatus is connected to the line 100 of a permanent irrigation system, controlled by a line valve 101 to supply water to a number of nozzles 102 located in laterals 103 of the main line. The apparatus is substantially the same as that hereinbefore described, but also includes means for introducing a gas into the line. In certain areas where heavy lime soil exists, it may be desirable to irrigate with water containing a substantial amount of carbon dioxide to break down certain of the lime concentrates. In other areas the soil may be depleted of nitrates and acid in character, and it may become desirable to add a small amount of ammonia or similar gas. Such gas may ordinarily be supplied in a bottle 104 as a liquid or highly compressed gas. The gas supply bottle will include a pressure regulator valve 105 so that the gas may flow from the regulator to the infusion apparatus through its supply line 106 at a selected uniform pressure regardless of the pressure of the gas in the supply tank.

The apparatus forming this modified infusion system will include a concentrate tank 24, a supply tube 25 therefrom, and a modified container box 26a and modified door 33a to connect to mechanisms therein. A delivery tube 27 extends from this box and connects into a pressure-relief T 28a which is connected into the line 100 downstream from the main valve 101. This apparatus is operated by a power line 29 which extends from a control box 30 to the infusion pump, the box 30 including a main switch 31, as hereinbefore described.

Figure 13:
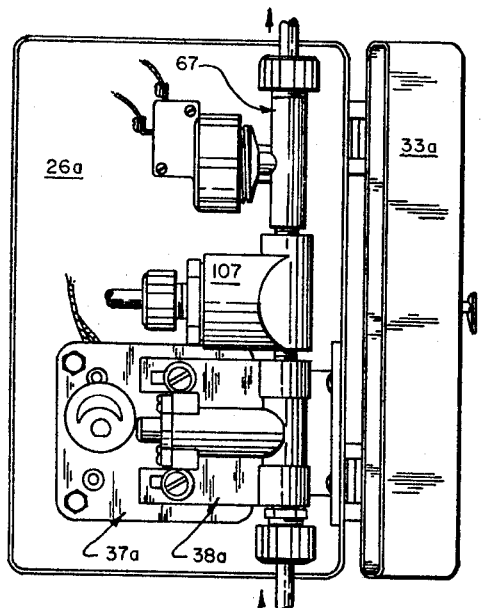
FIGURE 13 is a front elevational view, similar to FIG. 2 illustrating an open box having the pump, control and gas infusion apparatus.

The modified apparatus indicated at FIG. 13 includes a motor support base 34, a motor 37, the gear box 37a and a pump 38a, as hereinbefore described. The cut-out control 67, connecting with the delivery tube 27, is also the same as hereinbefore described. However, there is included in the tandem array, with the pump 38a and cut-out control 67, a gas-feed head 107 which is in the general form of a T having one threaded arm 108 turned into the enlargement 61a of the pump, and a threaded socket 109 as the other arm adapted to receive the arm 68 of the cut-out control 67, the passageway 110 through the arm portion of the T including an enlargement 111 at its intake to hold the spring 66a of the pump.

The leg 112 of this T-shaped gas-feed head 107 is formed as an enlarged cylindrical socket 113 having its lower portion smooth and its upper portion threaded to receive a closure nut 114. The top of the closure nut 114 is formed as a tubing connector 115 which is adapted to receive a tubing connector nut 116 holding the end of the gas line tube 106. The passageway 117 through the closure nut 114 is enlarged at its base to form a cylindrical socket concentric with the socket 113. A differential piston 118 is mounted within these sockets with O-ring seals 119 and 120 being fitted in grooves 121 and 122 at the respective larger and smaller ends of the piston to seal these ends in the larger and smaller cylindrical sockets 113 and 117. An air bleed line 123 extends through the wall of the leg between the seal positions to permit reciprocation of the piston under balanced pressures during operation, as will now be described.

A longitudinal, axially-centered passageway 124 extends through this piston with a small metering orifice 125 at its base to permit gas flow therethrough, and the base of the socket 113 includes a shallow, circular depression 126 having an O-ring seal 127 within it and with the upper edge of the seal extending above the socket to contact the undersurface of the piston 118. To complete the assembly, a passageway 128, in the base of the socket 113 at one side of the depression 126, connects with the passageway 110 through the legs of the unit.

In normal operation, this gas feed 107 opens or closes by movement of the piston onto the seal 127, depending upon the pressure balance in the system. When there is no pressure on the infusion lines and in the passage 110, the gas pressure from line 107 will hold the piston against the seal 127 and prevent gas flow. When back pressure in the line occurs and the infusion apparatus commences to operate, the pressure transmitted through passageway 128 to the bottom of the piston 118 will lift the piston from the O-ring 127 and permit gas to flow through orifice 125.

Figure 15:
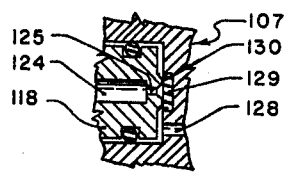
FIGURES 15 and 16 are fragmentary sectional details of a portion of the showing at FIG. 14, illustrating modified constructions of the seating and metering elements.
Figure 16:
Figure 14:
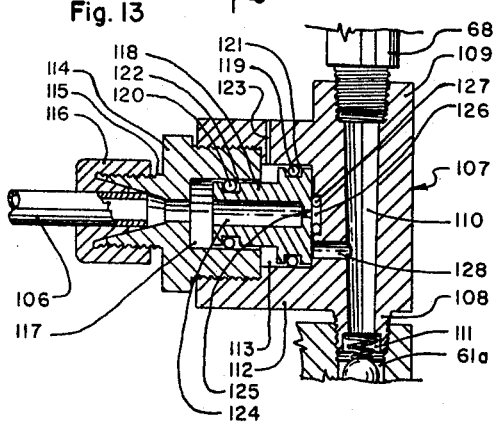
FIGURE 14 is a central, longitudinal sectional view of the gas infusion component of the apparatus illustrated at FIG. 13, but on an enlarged scale.

Modifications of the structure are illustrated at FIGS. 15 and 16. FIG. 15 illustrates the use of a flat washer 129 in the depression 126 and a circular seat 130 at the base of the piston, which protrudes a short distance to seat upon the washer 129. FIG. 16 illustrates the use of a removable orifice and adjustable plug 131 which may be turned into a threaded portion of the passageway 124 of the piston 118 in lieu of the control orifice 125, this plug 131 being removable and interchangeable for different gas applications.

Figure 17:
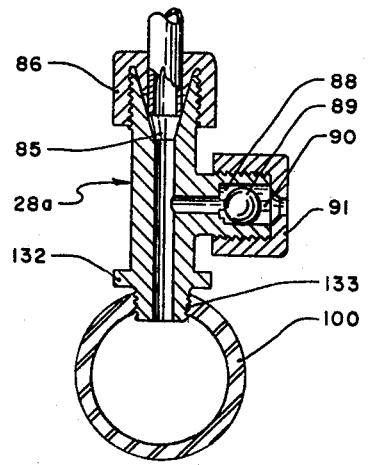
FIGURE 17 is a fragmentary sectional detail as taken from the indicated line 17—17 at FIG. 12, but on an enlarged scale.

FIG. 17 shows a pressure-relief T 28a which is modified from the cross construction by having one leg as its base end formed with a thread 132 so that it may be turned into a tapped hole 133 in the line 100 and having one leg with the tube connective fittings 85 and 86, hereinbefore described, and with the leg forming a pressure-relief valve by use of a passageway 88, ball 89, spline 90 and cap 91, with a central orifice 92, all as hereinbefore described.

I have now described my invention in considerable detail. However, it is obvious that others skilled in the art can build and device alternate and equivalent constructions which are within the spirit and scope of my invention. Hence, I desire that my protection be limited, not by the constructions illustrated and described, but only by the proper scope of the appended claims.

I claim:

1. Apparatus for infusing fluid concentrate into the water flow within a closed conduit of an irrigation system, of the type having a shut-off valve in the conduit and with said apparatus connecting into the conduit at a location adjacent to and downstream from the valve where a back pressure occurs in the conduit whenever the valve is opened to permit flow therethrough, and where negative pressure occurs whenever the valve closes, and comprising, in combination therewith:

(a) a container adapted to hold a supply of fluid concentrate;
 (b) a fluid line extending from the container and to the conduit at said location adjacent to and downstream from the valve where said back pressure, responsive to opening the valve, and said negative pressure, responsive to closing of the valve, are felt in the fluid line;
 (c) a positive displacement pump in the fluid line including an electrical power circuit adapted to operate the pump when the circuit is closed, said pump being adapted to pump fluid concentrate through the fluid line from the container and to the conduit at a selected constant rate;
 (d) a pressure-responsive control means in the fluid line below the infusion pump, including a normally open switch in the power circuit, adapted to close responsive to the said back pressure created by opening the valve, and to open responsive to a drop in back pressure created by closing the valve; and
 (e) a pressure relief, air-intake valve in the conduit adjacent to the juncture of the fluid line and the conduit adapted to open to admit air to the conduit responsive to said negative pressure whenever the aforesaid valve closes, whereby to prevent siphon action in said conduit from creating a flow of concentrate through the fluid line after opening of the switch stops the pump from operating.

2. Apparatus for infusing fluid concentrate and a gas into the water flow within a closed conduit of an irrigation system, of the type having a shut-off valve in the closed conduit, and where a back pressure occurs in the conduit below the valve whenever the valve is opened to permit flow therethrough, and comprising, in combination therewith:

(a) a container adapted to hold a supply of fluid concentrate;
 (b) a fluid line extending from the container and to the closed conduit at a point below the shut-off valve where said back pressure, responsive to opening the valve, is felt in the fluid line;
 (c) a positive displacement pump in the fluid line including an electrical power circuit adapted to operate the pump when the circuit is closed, said pump being adapted to pump fluid concentrate through the fluid line from the container and to the conduit at a selected constant rate;
 (d) a pressure-responsive control means in the fluid line below the infusion pump, including a normally open switch in the power circuit, adapted to close responsive to the said back pressure created by opening the shut-off valve;
 (e) a gas supply tank adapted to hold gas and to release the same at a selected pressure;
 (f) a supply line connecting the gas supply tank with the fluid line a a point down-stream from the pump; and
 (g) a normally closed pressure-responsive control valve at the juncture of the gas supply line and the fluid line adapted to prevent gas flow into the fluid line and adapted to open responsive to said back pressure in the fluid line to permit gas to flow into the fluid line with the operation of pumps.

3. In the apparatus defined in claim 2, wherein said control valve includes a differential piston, with gas pressure being against the smaller end thereof and line pressure being at the larger end thereof, a metering passageway through the piston, a valve means at the base of the larger side of the piston adapted to close said passageway when the piston is depressed towards the larger end, said piston being proportioned so that the gas pressure on the smaller end is sufficient to close the passageway by depressing the same towards the larger end, but such that the back pressure created by closing the shut-off valve and against the larger end is sufficient to lift the same to open the passageway and permit gas to flow therethrough.

References Cited

UNITED STATES PATENTS

| | | | |
|---|---|---|---|
| 786,871 | 4/1905 | Callahan | 103—37 X |
| 1,597,249 | 8/1926 | Riley | 92—170 X |
| 2,218,773 | 10/1940 | Sparling | 137—101.21 |
| 2,548,342 | 4/1951 | Brook et al. | 103—38 X |
| 2,757,044 | 7/1956 | Gerbracht | 239—310 X |
| 2,777,427 | 1/1957 | Nichols | 92—170 X |
| 3,104,614 | 9/1963 | Gramenzi | 200—83 X |
| 3,105,127 | 9/1963 | Peters | 200—83 |
| 3,150,676 | 9/1964 | Robinson | 137—101.21 |
| 3,172,363 | 3/1965 | Bennett et al. | 103—6 |

FOREIGN PATENTS 1,144,209  2/1963  Germany.

WILLIAM F. O'DEA, *Primary Examiner.*

D. J. ZOBKIW, *Assistant Examiner.*